United States Patent
Lee et al.

(10) Patent No.: US 7,007,495 B2
(45) Date of Patent: Mar. 7, 2006

(54) COMBINED VENTILATING AND AIR CONDITIONING SYSTEM

(75) Inventors: Won Hee Lee, Seoul (KR); Yoon Jei Hwang, Seoul (KR); Chan Ho Song, Gwacheon-si (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 10/694,017

(22) Filed: Oct. 28, 2003

(65) Prior Publication Data
US 2004/0194490 A1 Oct. 7, 2004

(30) Foreign Application Priority Data
Dec. 26, 2002 (KR) .................. 10-2002-0083916

(51) Int. Cl.
F25D 23/00 (2006.01)
F25D 17/06 (2006.01)
F25D 17/04 (2006.01)

(52) U.S. Cl. .................. 62/271; 62/419; 62/410
(58) Field of Classification Search .................. 62/271, 62/419, 93, 94, 406, 410, 412
See application file for complete search history.

(56) References Cited
U.S. PATENT DOCUMENTS
5,579,647 A * 12/1996 Calton et al. .................. 62/94

2004/0123616 A1 * 7/2004 Lee et al. .................. 62/271

FOREIGN PATENT DOCUMENTS
JP 2000111096 A * 4/2000

* cited by examiner

Primary Examiner—Chen Wen Jiang
(74) Attorney, Agent, or Firm—Greenblum & Bernstein, P.L.C.

(57) ABSTRACT

Disclosed is a combined ventilating and air conditioning system, comprising: a first air duct for guiding outdoor air to the indoor spaces, the first air duct being capable of opening and closing; a second air duct for guiding indoor air to outdoors, wherein the second air duct is capable of opening and closing and installed in such a manner that part of the second air duct intersects with the first air duct; a third air duct for guiding the indoor air to the outdoors, the third air duct being capable of opening and closing; a regenerative heat exchanger, being provided in an intersection between the first and second air ducts, for exchanging heat between the indoor air and the outdoor air passing through the intersection; and blowing fans for controlling airflows, being provided in the first air duct, in the second air duct, and in the third air duct, respectively. The compressor mounted on the air conditioner is provided in the third air duct. The second heat exchanger is provided nearby the third air duct through which the indoor air is intaken, and the first heat exchanger is provided nearby the first air duct through which the outdoor air is emitted from the first air duct to the indoor spaces.

40 Claims, 7 Drawing Sheets

FIG.1

Prior Art

COMBINED VENTILATING AND AIR CONDITIONING SYSTEM

CROSS-REFERENCE TO RELATED APPLICATIONS

This application claims the benefit of Korean Application No. P2002-0083916, filed on Dec. 26, 2002, which is hereby incorporated by reference as if fully set forth herein.

BACKGROUND OF THE INVENTION

1. Field of the Invention

The present invention relates to an air conditioning system, and more particularly, to a combined ventilating and air conditioning system, capable of being operated as a dehumidifying device and ventilator in both an air cooling mode and an air heating mode.

2. Background of the Related Art

In general, an air conditioner set conditions on the air within a specific area, by adjusting temperature, humidity, air motion, and cleanliness of the air.

For example, the air conditioner is similar to a heating and cooling system that cools or heats up the air in the interiors of a house, restaurant, library, or office.

Figure 1:
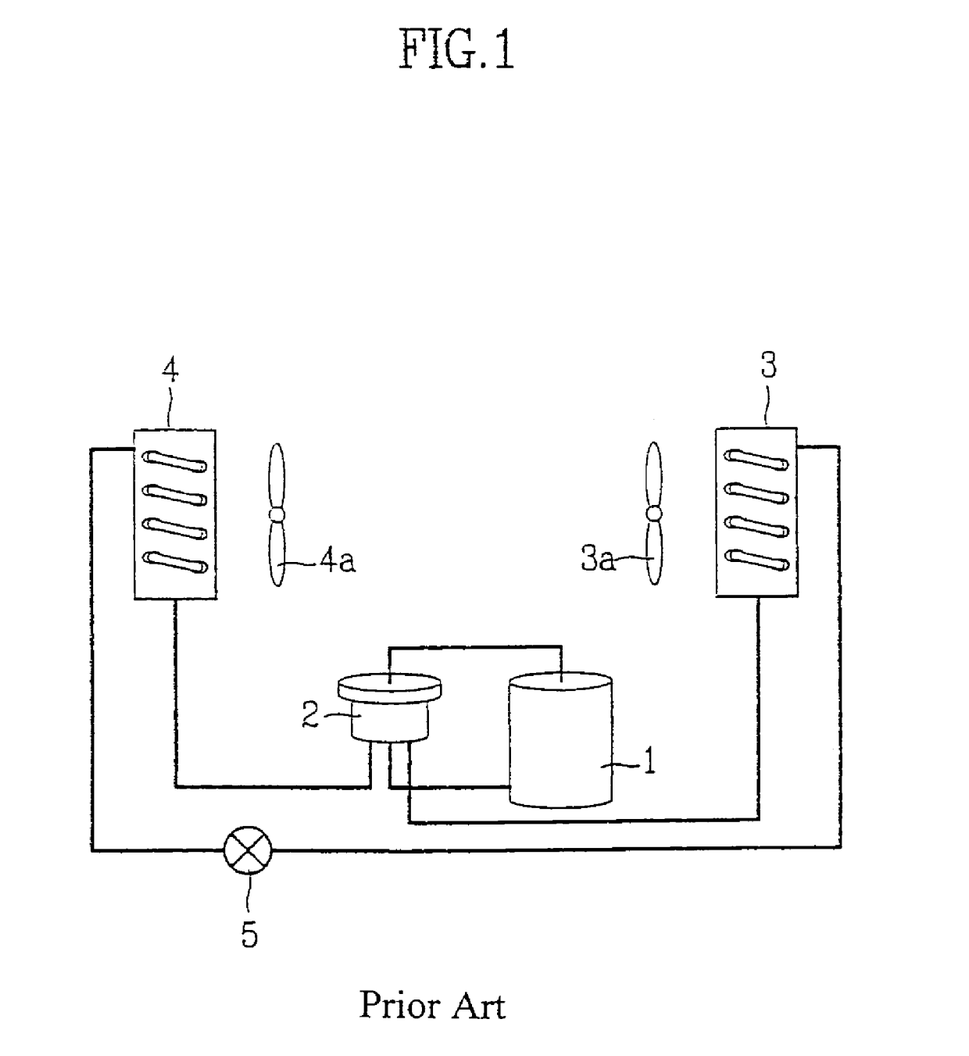
FIG. 1 is a schematic diagram illustrating a general heating and cooling system according to a related art.

FIG. 1 is a schematic diagram of a heating and cooling system of an air conditioner of the related art.

The construction and operational characteristics of the general heating and cooling system will be explained with reference to FIG. 1, followed by the problems with the system.

At first, the general hating and cooling system comprises a compressor 1, an refrigerant passage controller 2, an indoor heat exchanger 3, an outdoor heat exchanger 4, and an expansion device 5. In the vicinity of the outdoor heat exchanger 4, an outdoor blowing fan 4a is provided. Similarly, in the vicinity of the indoor heat exchanger 3, an indoor blowing fan 3a is provided.

The above heating and cooling system guides refrigerants emitted from the compressor 1 by the motion controller 2 selectively to the indoor heat exchanger 3 or the outdoor heat exchanger 4, according to the mode of system operation. Typically, the refrigerant passage controller 2 comprises a four-port valve.

Next, the operation of the heating and cooling system in an air cooling mode is explained.

The compressed refrigerant at a high temperature and a high pressure in the compressor is led to the outdoor heat exchanger via the four-port valve, and condensed through heat exchange with outdoor air. The condensed refrigerant is then moved to the expansion device.

In the expansion device, the refrigerant is expanded at a low temperature and a low pressure, and sent to the indoor heat exchanger, where the refrigerant absorbs the heat of the indoor air and is evaporated. This evaporated refrigerant is returned to the compressor.

As the indoor blowing fan rotates, the indoor air passes through the indoor heat exchanger and is cooled therein. Then, the cooled air is emitted back to the interior, cooling the air in the indoor space to a designated temperature.

The operation of the heating and cooling system in an air heating mode is now described.

The compressed refrigerant at a high temperature and a high pressure in the compressor is led to the indoor heat exchanger via the four-port valve, and condensed by releasing heat energy into the indoor air. The condensed refrigerant is then moved to the expansion device.

The indoor air is heated up as it passes through the indoor heat exchanger, being guided by the indoor blowing fan. Later, the hot air is emitted back to the interior, heating up the air in the indoor space to a designated temperature.

In the expansion device, the refrigerant is expanded at a low temperature and a low pressure, and sent to the outdoor heat exchanger, where the refrigerant absorbs the heat of the outdoor air, and it is returned to the compressor.

Performing the above procedures in a cycle, a user can adjust the temperature of the indoor space, heating or cooling as desired.

However, the general heating and cooling system has the following defects.

First of all, since the heating and cooling processes by the general heating and cooling system are performed by repeatedly circulating the indoor air, with doors and windows shut down. Thus after a certain amount of time, the air of the interior gets dry and stuffy, so the user usually opens the window to ventilate indoor spaces.

In so doing, that is, ventilating indoor spaces by emitting the indoor air to the outside, a lot of heat is lost and as the user turns on the system again after the ventilation, power consumption is sharply increased.

To solve the foregoing problems and disadvantages, a heating and cooling system that is capable of heating, cooling and ventilating the air within indoor spaces, and reducing heat loss during the ventilation, is needed.

SUMMARY OF THE INVENTION

Accordingly, the present invention is directed to a combined ventilating and air conditioning system that substantially obviates one or more problems due to limitations and disadvantages of the related art.

An object of the present invention is to provide a combined ventilating and air conditioning system, capable of heating or cooling, and ventilating the air within a space, or exclusively ventilating indoor spaces.

Another object of the present invention is to provide a combined ventilating and air conditioning system, capable of minimizing heat loss during the ventilation of indoor spaces.

Still another object of the present invention is to provide a combined ventilating and air conditioning system mounted with a dehumidifying device capable of dehumidifying the air flown from the outside.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the combined ventilating and air conditioning system comprises: a combined ventilating and air conditioning system, comprising: a first air duct for guiding outdoor air to the indoor spaces, the first air duct being capable of opening and closing; a second air duct for guiding indoor air to outdoors, wherein the second air duct is capable of opening and closing and installed in such a manner that part of the second air duct intersects with the first air duct; a third air duct for guiding the indoor air to the outdoors, the third air duct being capable of opening and closing; a regenerative heat exchanger, being provided in an intersection between the first and second air ducts, for exchanging heat between the indoor air and the outdoor air passing through the intersection; and blowing fans for controlling airflows, being provided in the first air duct, in the second air duct, and in the third air duct, respectively.

Here, the air conditioner comprises: a compressor, a first heat exchanger and a second heat exchanger for heating or cooling indoor spaces, a refrigerant passage controller for guiding a refrigerant compressed by the compressor to the first or second heat exchanger according to a driving mode of the system, and an expansion device for expanding a high-temperature, high-pressure refrigerant, being provided between the first heat exchanger and the second heat exchanger.

The compressor and the second heat exchanger are provided in the third air duct. More specifically, the second heat exchanger is provided nearby the third air duct through which the indoor air is discharged, and the first heat exchanger is provided nearby the first air duct through which the outdoor air is emitted from the first air duct to the indoor spaces.

The driving modes of the air conditioning system comprise a first mode for cooling the indoor spaces being closed; a second mode for cooling and ventilating the indoor spaces; a third mode for heating the indoor spaces being closed; a fourth mode for heating and ventilating the indoor spaces; and a fifth mode only for ventilating the indoor spaces. The regenerative heat exchanger for minimizing heat loss during the ventilation process comprises a first channel through which an air from an outside via the first air duct passes and a second channel through which an air from the indoor spaces via the second air duct passes, the second channel being in contact with the first channel.

The outdoor air passing through the first channel of the regenerative heat exchanger exchanges heat with the indoor air passing through the second channel of the regenerative heat exchanger, thereby minimizing heat loss.

To improve the efficiency of the heat exchange, the regenerative heat exchanger has a multi-layer structure wherein the first and second channels, made of aluminum with excellent heat conductivity, are layered alternately.

Preferably, the combined ventilating and air conditioning system further comprises a dehumidifying device coated with a desiccant material for absorbing humidity from air flowing in the first air duct, and according to the displacement, for emitting the absorbed humidity to air flowing in the third air duct.

Here, the third air duct is installed parallel with the first air duct, and silica gel, which is very hygroscopic, is preferably used as the desiccant material.

Preferably, the combined ventilating and air conditioning system further comprises a reheater to be provided in the third air duct, to reheat the air discharged from the second heat exchanger to the dehumidifying device.

The combined ventilating and air conditioning system with the above construction can be advantageously used for ventilating inside spaces whenever the heating or cooling system is in operation, for minimizing heat loss during the ventilation, and for dehumidifying outside air with a dehumidifying device in case the outside air is very humid.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are comprised to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

For a better understanding of the present invention, the functions of an air conditioner are described. The air conditioner set conditions on the air within a specific area, by adjusting temperature, humidity, air motion, and cleanliness of the air. For example, the air conditioner is similar to a heating and cooling system that cools or heats up the air in the interiors of a house, restaurant, library, or office.

The present invention provides an air conditioning system incorporating a ventilating function. The construction of the air conditioning system will discussed with reference to FIG. 2, and the operational procedure of another air conditioning system in a driving mode will be discussed with reference to FIG. 3.

Figure 2:
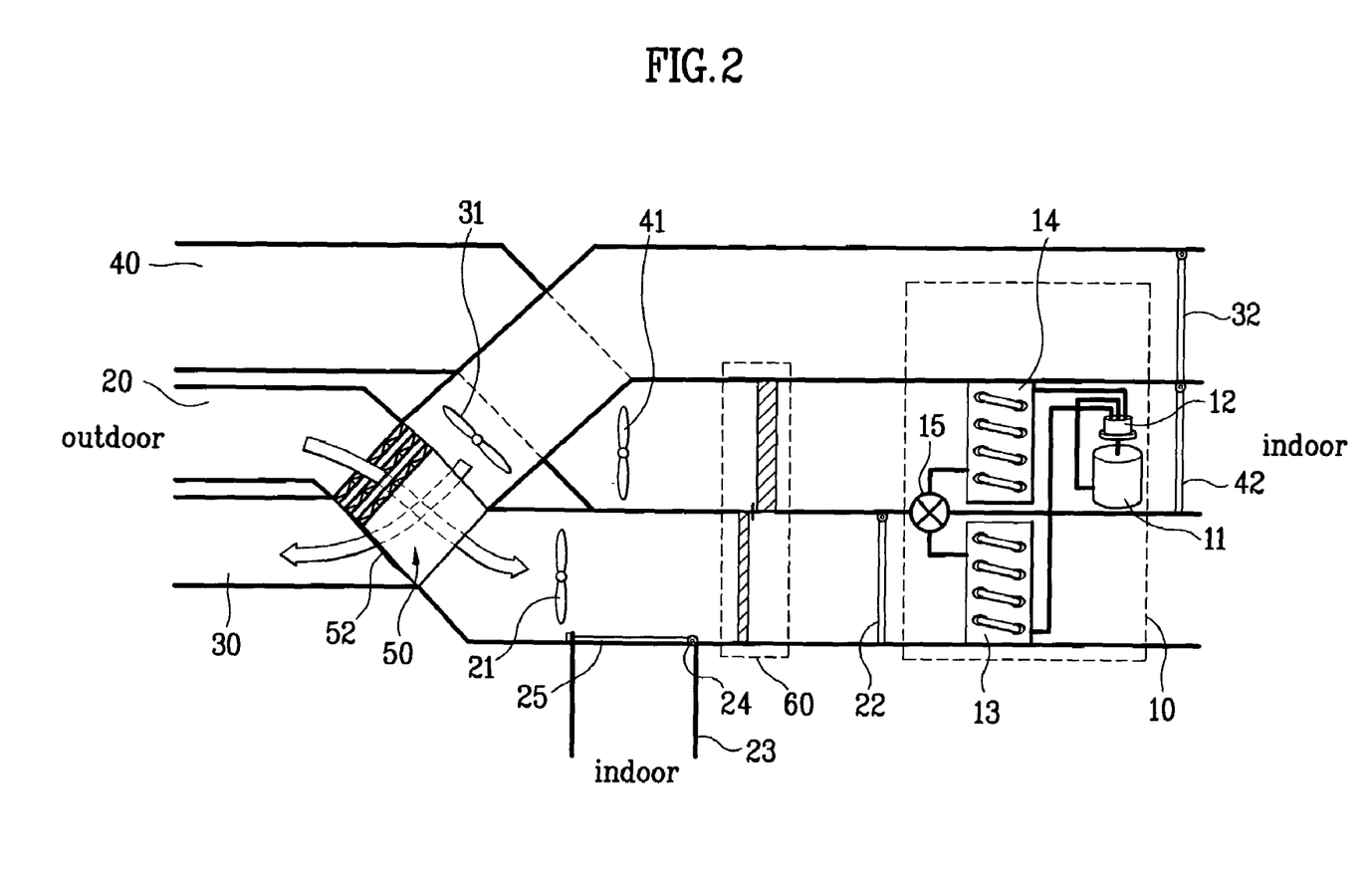
FIG. 2 is a schematic diagram illustrating an air conditioning system according to the present invention.

Referring to FIG. 2, the construction of the invention is first explained.

The air conditioning system incorporating a ventilating function comprises an air conditioner 10 for heating and cooling air, a first air duct 20 for guiding outdoor air to the inside, the air duct being capable of opening and closing, a second air duct 30 for guiding indoor air to the outside, part of the second air duct intersecting with the first air duct and being capable of opening and closing, a third air duct 40 for guiding the indoor air to the outside, being capable of opening and closing, a regenerative heat exchanger 50 for exchanging heat between the indoor air and the outdoor air that pass through the intersection of the first and second air ducts 20 and 30, and blowing fans 21, 31, and 41 provided in the first air duct 20, the second air duct 30, and the third air duct 40, respectively.

The air conditioner 10 comprises a compressor 11, first heat exchanger 13 for heating or cooling indoor spaces, a second heat exchanger 14, an refrigerant passage controller 12 for guiding compressed refrigerants by the compressor to the first or second heat exchangers according to a driving mode of the system, and an expansion device 15 provided in-between the first heat exchanger and the second heat exchanger for expanding a high-temperature, high-pressure refrigerant to a low-temperature, low-pressure state.

The compressor 11 and the second heat exchanger 14 are provided in the third air duct 40, and the first heat exchanger 13 is provided in the first air duct 20. More preferably, the first heat exchanger is provided nearby an inlet of the first air duct 20, through which the outdoor air passes, and the second heat exchanger 14 is provided at an outlet of the third air duct 40, through which the outdoor air is emitted.

When the compressor 11 is provided as discussed above, the air moving along the third air duct 40 cools the compressor 11, preventing the compressor from being overheated.

On the other hand, the blowing fan 21 for the first air duct is called a first blowing fan, the blowing fan 31 for the second air duct is called a second blowing fan, and the blowing fan 41 for the third air duct is called a third blowing fan 41.

There are five different driving modes of the air conditioning system incorporating an air ventilating function: a first mode for cooling the indoor spaces while all doors and windows being shut, a second mode for cooling and ventilating the indoor spaces concurrently, a third mode for heating the indoor spaces while all doors and windows being shut, a fourth mode for heating and ventilating the indoor spaces concurrently, and a fifth mode only for ventilating the indoor spaces.

The regenerative heat exchanger 50 for reducing heat loss during the ventilation comprises a first channel 51 through which the outdoor air from the outside moves along the first air duct 21, and a second channel 52 through which the indoor air from the inside moves along the second air duct 30, wherein the second channel 51 is provided close to the first channel 51.

The outdoor air passing through the first channel 51 of the regenerative heat exchanger 50 exchanges heat with the indoor air passing through the second channel 52, thereby reducing heat loss.

To improve heat exchange efficiency of the regenerative heat exchanger 50, the regenerative heat exchanger is constructed in such a manner than the first channel 51 and the second channel 52 across alternately in a zigzag form, and preferably it is composed of multi-layers. This is because the heat exchange area is increased, eventually increasing the efficiency of the regenerative heat exchanger. Moreover, the channels 51 and 52 are preferably made of materials having excellent heat conductivity, such as aluminum.

Figure 4A:
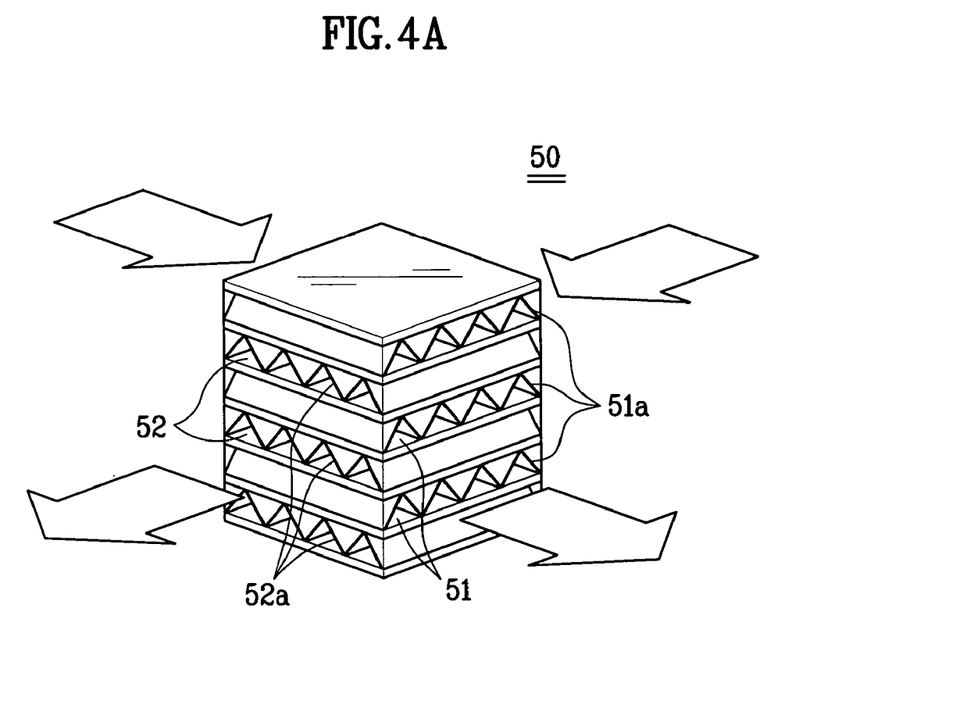
FIG. 4A and FIG. 4B are detailed diagrams, respectively illustrating a regenerative heat exchanger according to an exemplary embodiment of the present invention.
Figure 4B:
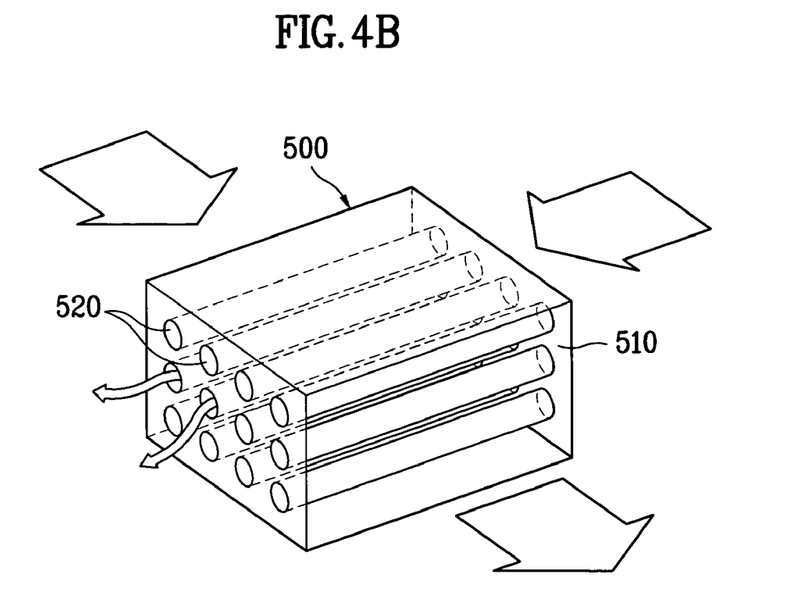

As depicted in FIG. 4B, the second channel 520 can also be composed of a plurality of pipes that cross the first channel 510. That is, all possible embodiments can be utilized as long as they can maximize the heat exchange area of air flowing inside the first and third air ducts 20 and 40.

The combined ventilating and air conditioning system absorbs humidity, namely desiccates, the air flowing inside the first air duct 20, and changing the position, further comprises a dehumidifying device coated with a desiccant material for emitting the absorbed humidity (moisture) to the air flowing in the third air duct 40.

Here, the third air duct 30 is preferably installed parallel with the first air duct 20. As for the desiccant material, silica gel that is very hygroscopic is frequently used.

Meanwhile, the dehumidifying device can be provided in the first air duct 20 only, desiccating the outdoor air passing through the first air duct.

Preferably, the dehumidifying device is provided between the first heat exchanger 13 and the regenerative heat exchanger 50. This is because during the summer when the humidity is pretty high, the regenerative heat exchanger 50 lowers the temperature of hot, humid air that passes through therein. Then the relative humidity of the air is increased, and the efficiency of the dehumidifying device 60 is improved.

Conveniently, it is possible to make the dehumidifying device 60 run only when the humidity is pretty high. Also, it can be removable, so the user can attach or detach the dehumidifying device as necessary.

The first blowing fan 21 and the second blowing fan 31 are provided in the inlet or the outlet of the regenerative heat exchanger 50, respectively. And the third blowing fan 41 can be provided in the inlet or the outlet of the dehumidifying device 60.

In general, electronic switches 22, 32 and 42 open or close each air duct in the combined ventilating and air conditioning system.

The electronic switch 22 in the first air duct is provided indoor with respect to the regenerative heat exchanger 50, and more preferably, it is disposed between the regenerative heat exchanger 50 and the first heat exchanger 13.

In like manner, the electronic switch 32 in the second air duct is provided indoor with respect to the regenerative heat exchanger 50, and the electronic switch 42 in the third air duct is provided indoor with respect to the second heat exchanger 14.

The air conditioning system further comprises a ventilation duct 23 for leading the outdoor air directly into the interior, being connected to the air duct between the first blowing fan 21 and the first heat exchanger 13. In addition, a damper 25 is provided near the juncture of the ventilation duct 23 and the first air duct 20, rotating by hinges 24. The damper 25 closes or opens the ventilation duct 23 and the first air duct 20 according to the driving mode of the system.

Described in the following is a combined ventilating and air conditioning system according to other exemplary embodiments, with reference to FIGS. 3, 4 and 5.

Figure 3:
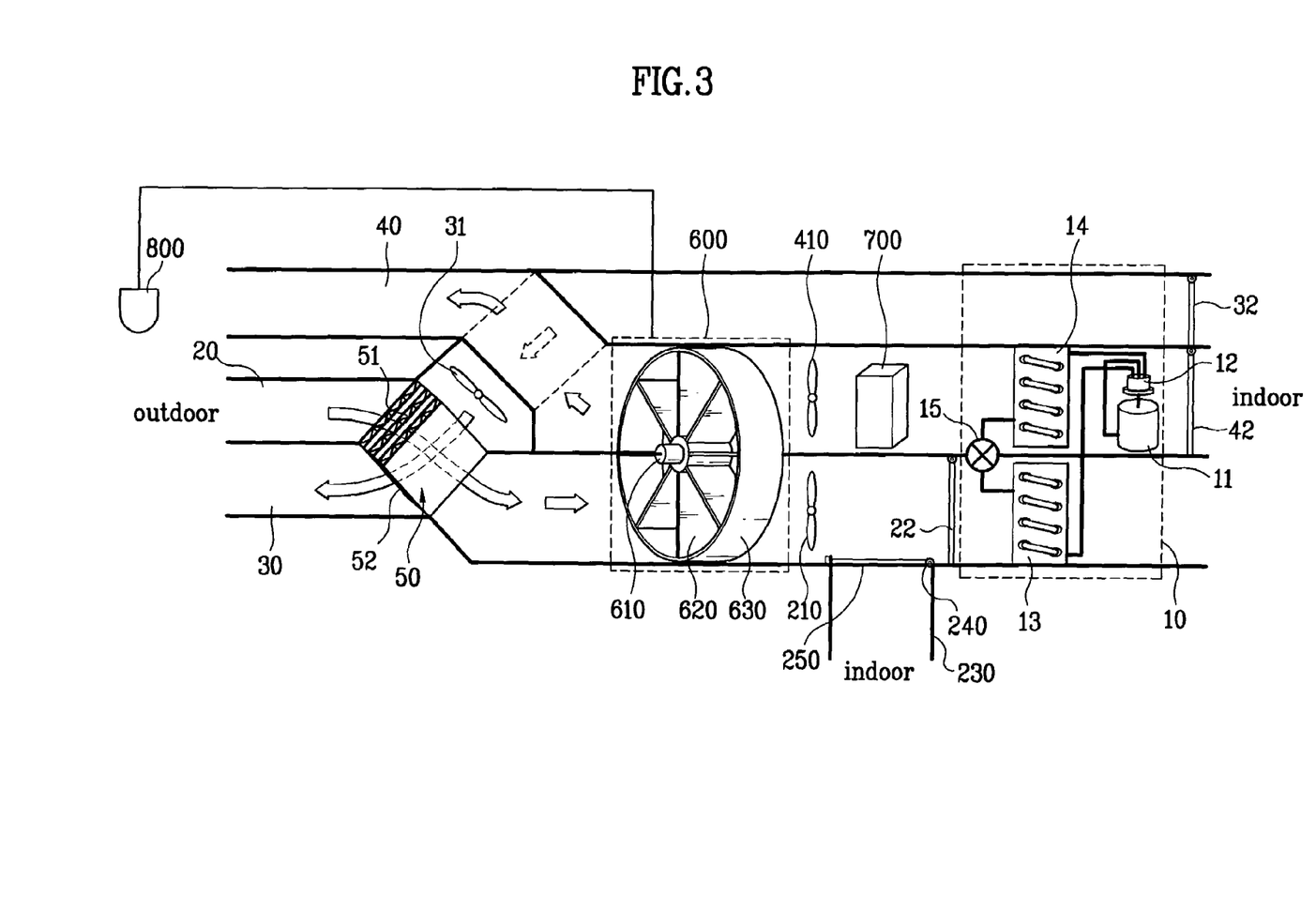
FIG. 3 is a schematic diagram illustrating an air conditioning system according to an exemplary embodiment of the present invention.

Referring to FIG. 3, the combined ventilating and air conditioning system comprises an air conditioner 10, a first air duct 20, a second air duct 30, a third air duct 40, three blowing fans provided in each of the air duct, a regenerative heat exchange 50, a dehumidifying device 600, and a ventilation duct 230, in a similar manner as mentioned above.

Therefore, instead of explaining each component, only characteristic or additional construction of the system will now be discussed.

At first, the first and second channels 51 and 52 of the regenerative heat exchanger 50 comprise zigzag-shaped plates 51a and 52b, respectively. As mentioned above, the channels are preferably made of materials with high heat conductivity, such as aluminum or copper.

To be more specific, as shown in FIG. 4A, the rectangular first channel 51 and the second channel 52 are layered alternately, and comprise the zigzag shaped plates 51a and 52b therein. This type of structure is known to enlarge the heat exchange area between the outdoor air and the indoor air as they pass through the regenerative heat exchanger 50, consequently increasing the heat exchange efficiency thereof.

Next, the dehumidifying device 600 comprises a axis that is installed side by side with the first and third air ducts 20 and 40, a plurality of blades 620 coated with a desiccant material, being radially extended out of the axis at regular intervals, and a rim 630 for encompassing the ends of the blades.

The dehumidifying device runs when the humidity of the outdoor air is high, and a humidity sensor 800 measures outside humidity.

Figure 5:
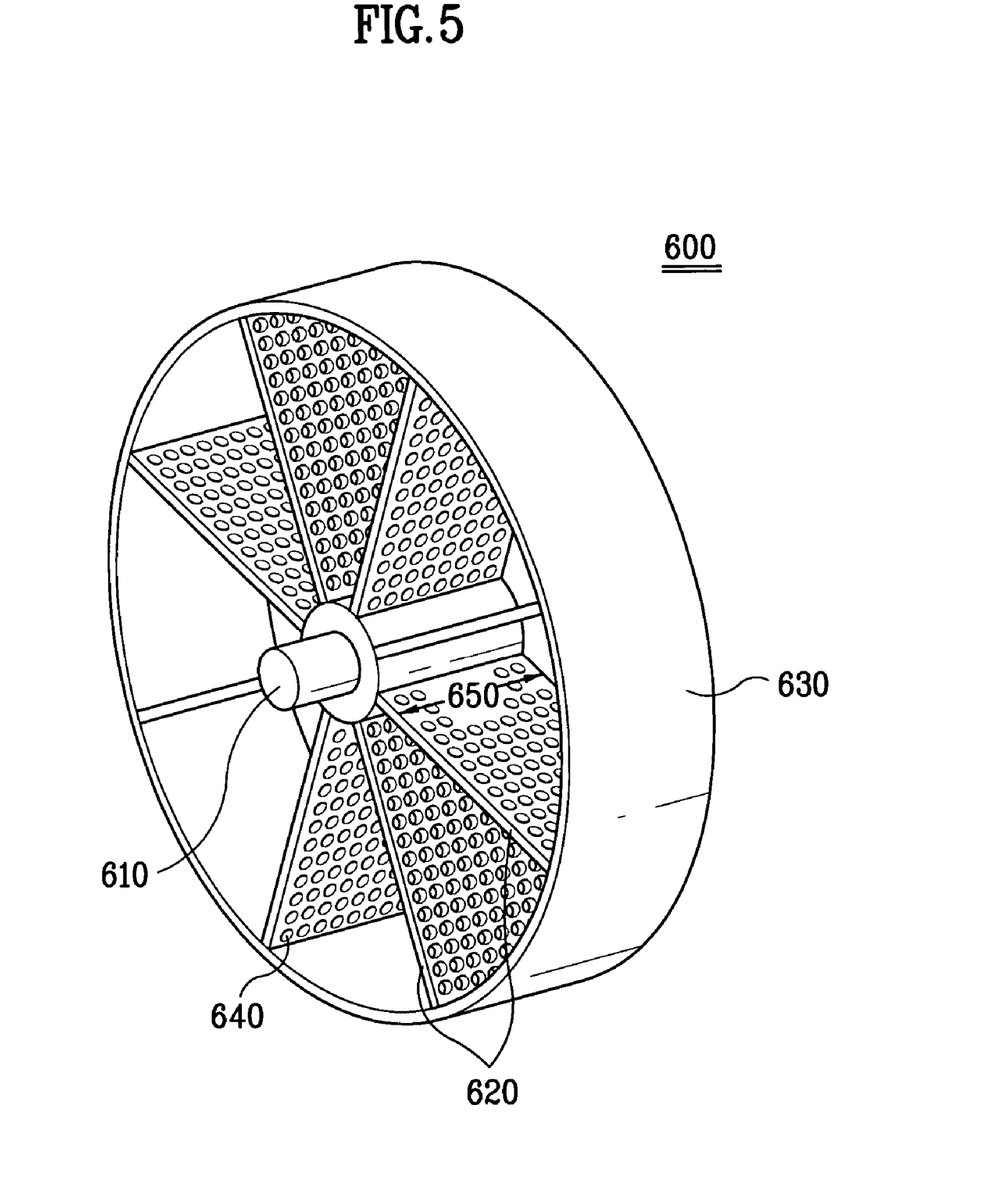
FIG. 5 is a perspective view of a dehumidifying device to which the present invention is applied.

To explain more about the dehumidifying device 600 with reference to FIG. 3 and FIG. 5, the dehumidifying device absorbs humidity in the air through the first air duct 20, and rotates the air around the axis 610, and emits the humidity being collected into the air when the air passes through the third air duct 40.

In general, the desiccant absorbs humidity in the air under a certain temperature, and emits the humidity to the outside when the temperature goes high. Typically used desiccant comprises silica gel or titanium silicate, each having the above properties.

As illustrated in FIG. 3, the dehumidifying device is built in such a manner that almost half of the dehumidifying device 600 is exposed to the first air duct 20, and the other half is exposed to the third air duct 40.

Both ends of the axis 610 are fastened to an opening of the juncture, to be rotated freely. The blades 620 are radially extended out of the axis 610, and air passages are formed in-between the blades 56b. The rim 630 covers the outside ends of the blades 620 in a circle. The dehumidifying device 600 is rotated by a driving device like a motor being connected to the axis 610.

To facilitate airflows in the first and third air ducts 20 and 40 more smoothly by the rotation of the dehumidifying device 600, a plurality of holes 640 are formed on the blades 610. This is because the blades 620 are the ones that are in contact with the air passing through the first and third air ducts 40 the most.

Although the blades often disturb the airflow as the dehumidifying device 600 rotates, the plurality of air passing holes 640 on the blades result in counter-effect. Preferably, air passage holes are formed on the rim 630 as well, to come in contact with the humid air more effectively.

As another way to make the blades 620 come in contact with the airflow more effectively, the cross-section of the juncture of the first air duct 20 and the third air duct 40 should be circular, just like the circumferential surface of the rim 630. In this manner, most of the air flows into the rim 630, and is reacted with the desiccant being applied to the blades 620.

To optimize the dehumidifying function, each of the blades 620 has a predetermined width 650 in the direction of the airflows in the first and third air ducts 20 and 40. The width 650 is determined in consideration of the outdoor environment and the humidity of a place where the air conditioning system is supposed to be installed. For instance, if the air conditioning system should be installed in a very humid place, the width 650 of the blades 620 is increased so as to expand the contact area of the blades and air, thereby dehumidifying or desiccating the air more effectively.

The operational principle involved in the dehumidifying process of the dehumidifying device 600 is now explained below.

Particularly, the part of the dehumidifying device being exposed to the first air duct 20 absorbs humidity in the outdoor air. The humidity is then transferred to the air through the third air duct 40 by the rotation of the dehumidifying device 600, and emitted to the indoor air that moves along the third air duct 40. Later, the humidity and the indoor air are released to outdoors. In this way, it is possible to dehumidify or desiccate the air flowing into the indoor spaces.

Sometimes the combined ventilating and air conditioning system further comprises a reheater 700 inside the third air duct 40, to reheat the air flowing into the dehumidifying device 600 from the second heat exchanger 14. The reheater 700 makes the emission of the humidity the dehumidifying device 600 absorbed more smoothly, by lowering the relative humidity of the indoor air being emitted to outdoors through the third air duct 40.

Of course, what the reheater 700 does can be accomplished by the second heat exchanger 14 provided in the third air duct 40 and by the heat energy being generated from the compressor 11. However, the reheater 700 becomes very useful and convenient when the air conditioning system runs in the fourth mode.

The first blowing fan 21 is preferably provided between the dehumidifying device 600 and the first heat exchanger 13. This is because the blowing fan 21 can be easily eroded by the relatively less humid outdoor air having passed through the dehumidifying device. Hence, the third blowing fan 41 is preferably provided between the dehumidifying device 600 and the reheater 700.

The operations of the combined ventilating and air conditioning system in each of the driving modes are explained.

First of all, the operation of the combined ventilating and air conditioning system in the first mode is as follows.

The first air duct 20, the second air duct 30, the third air duct 40, and the ventilation duct 230 are all shut down, and only the air conditioner 10 is in operation. Since the operational procedure involved in cooling the indoor spaces is pretty much identical with that of the general air conditioner, only a brief description thereof will be provided here.

The refrigerant being compressed at a high temperature and a high pressure in the compressor is introduced to the second heat exchanger 14 by the refrigerant passage controller 12, where the refrigerant undergoes a radiation process, and the refrigerant is expanded in the expansion device 15 at a low temperature and a low pressure. This low-temperature, low-pressure refrigerant absorbs heat from the air circulating the indoor spaces in the first heat exchanger 13, and is again sucked into the compressor.

The operation of the combined ventilating and air conditioning system in the second mode is as follows.

The switches 22, 32 and 42 of each of the first air duct, the second air duct, and the third air duct are opened, and only the ventilation duct 230 is shut down. The blowing fans 21, 31, 41 mounted on each of the air ducts start running. Then the outdoor air flows in the first air duct 20, and the indoor air flows in the second and third air ducts 30 and 40.

The air conditioner 10 in the second mode operates similarly to the one in the first mode, except that the first heat exchanger 13 exchanges heat with the outdoor air emitted to the indoor spaces via the first air duct 20, and the second heat exchanger 14 exchanges heat with the indoor air guided to the third air duct 40.

In the regenerative heat exchanger 50, the outdoor air flowing in the first air duct 20 exchanges heat with the indoor air flowing in the second air duct 30, and so quickly cooled down. The outdoor air emitted from the regenerative heat exchanger 50 passes through the dehumidifying device 600, is cooled down through a heat exchange process in the first heat exchanger 13, and is emitted to the indoor spaces.

The moisture the dehumidifying device 600 absorbed is discharged to the indoor air that is emitted to outdoors through the third air duct 40 by the rotation of the dehumidifying device.

When the outdoor air is dry, the dehumidifying process will not be necessary, so the dehumidifying device 600 is turned off and the electronic switch 42 of the third air duct is closed. Thus the indoor air is emitted only through the second air duct 30. At this time, the second heat exchanger 30 is the one that exchanges heat with the outdoor air.

The operation of the combined ventilating and air conditioning system in the third mode is as follows.

The first air duct 20, the second air duct 30, the third air duct 40, and the ventilation duct 230 are all shut down, and only the air conditioner 10 is in a driving mode. The process involved with heating the indoor spaces is opposite of the procedure in the first mode.

That is, the refrigerant being compressed at a high temperature and a high pressure in the compressor 11 is transferred to the first heat exchanger 13 by the refrigerant passage controller 12, where the refrigerant undergoes a radiation process (to release the heat energy to the air circulating in the indoor spaces), and the refrigerant is expanded in the expansion device 15 at a low temperature and a low pressure. This low-temperature, low-pressure refrigerant absorbs heat from the outdoor air in the second heat exchanger 13, and is again sucked into the compressor 11.

The operation of the combined ventilating and air conditioning system in the fourth mode is as follows.

The switches 22, 32 and 42 of each of the first air duct, the second air duct, and the third air duct are opened, and only the ventilation duct 230 is shut down. The blowing fans 21, 31, 41 mounted on each of the air ducts start running. Then the outdoor air flows in the first air duct 20, and the indoor air flows in the second and third air ducts 30 and 40.

The air conditioner 10 in this mode operates similarly to the one in the third mode, except that the first heat exchanger 13 exchanges heat with the outdoor air emitted to the indoor spaces via the first air duct 20, and the second heat exchanger 14 exchanges heat with the indoor air transferred to the third air duct 40.

In the regenerative heat exchanger 50, the outdoor air flowing in the first air duct 20 absorbs part of heat from the indoor air flowing in the second air duct 30, and so quickly warmed up. The outdoor air emitted from the regenerative heat exchanger 50 passes through the dehumidifying device 600, where the outdoor air is dehumidified, and is emitted to the indoor spaces after going through a heat exchange process with the first heat exchanger 13.

The moisture the dehumidifying device 600 absorbed is discharged to the indoor air that is emitted to outdoors through the third air duct 40 by the rotation of the dehumidifying device. The follow-up dehumidifying process is same with the one discussed before. However, in this mode, the air being transferred to the dehumidifying device via the third blowing fan 40 is heated up by the reheater 700.

Operating the system in the fourth mode means that the temperature of the outdoor air is higher than that of the indoor air, so the dehumidifying process is not required in most cases. Thus the dehumidifying device 700 is turned off, and the electronic switch 42 of the third air duct is closed. In this case, the indoor air can be emitted only through the second air duct 30, and the second heat exchanger 14 is the one that exchanges heat with the outdoor air.

Finally, the operation of the combined ventilating and air conditioning system in the fifth mode is as follows.

Figure 6:
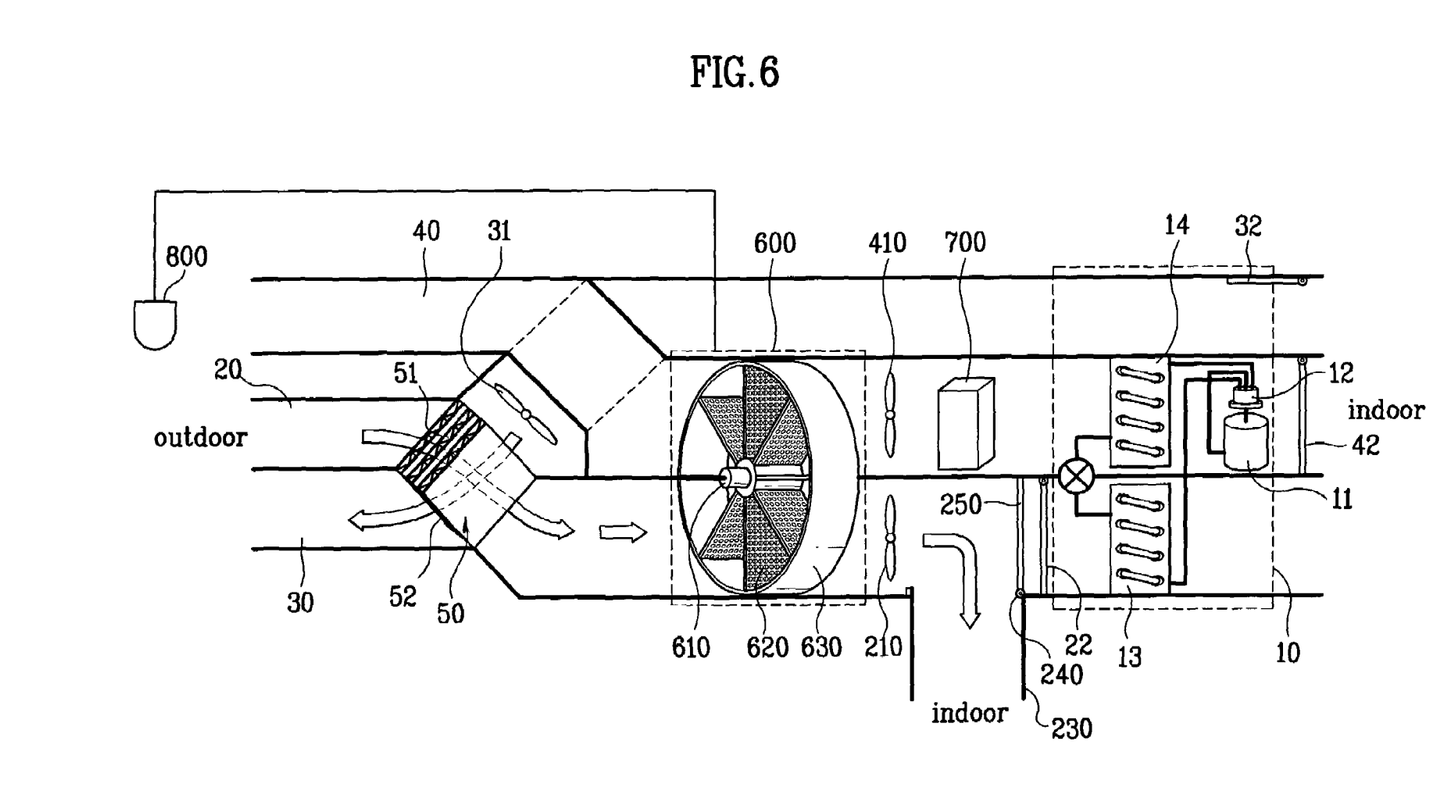
FIG. 6 diagrammatically illustrates an air motion state when the air conditioning system of FIG. 2 is exclusively in an air ventilating mode.

First of all, the third blowing fan 41 stops running, and the electronic switch 42 is closed, and the air conditioner 10, the dehumidifying device 600, and the reheater 700 are turned off. As the first and second blowing fans 21 and 31 start rotating, the damper 250 mounted on the ventilation duct 230 shuts down the first air duct 20.

As a result, the outdoor air is transferred to the indoor spaces via the first channel 51 of the regenerative heat exchanger 50 and the ventilation duct 230. The indoor air is then emitted to outdoors via the second channel 52 of the regenerative heat exchanger 50. Since the outdoor air and the indoor air exchange heat with each other in the regenerative heat exchanger 50, it is possible to reduce heat loss.

The fifth mode can be concurrently performed with the first through fourth modes discussed above, or independently.

Figure 7:
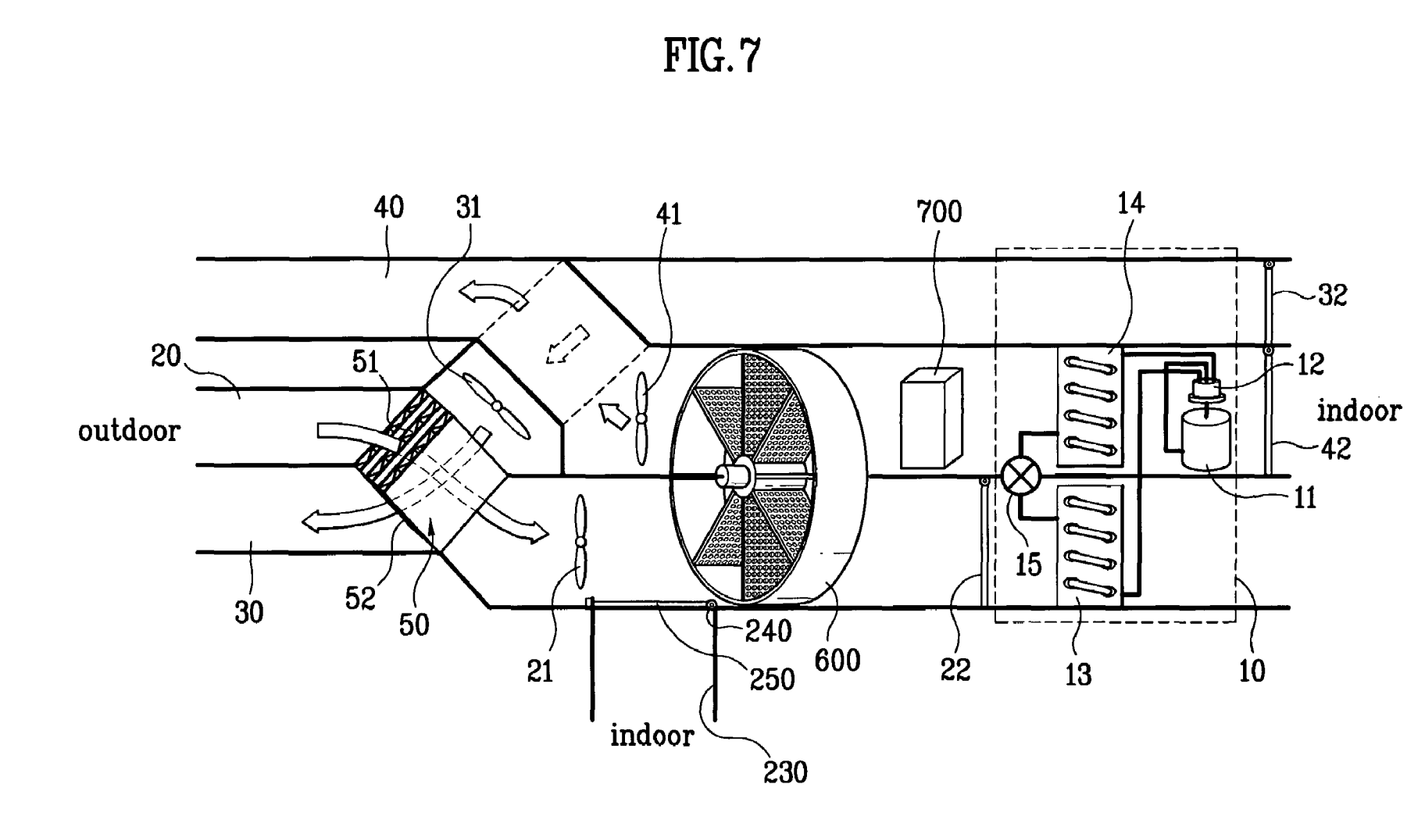
FIG. 7 is a schematic diagram illustrating an air conditioning system according to another exemplary embodiment of the present invention.

FIG. 7 is a schematic diagram illustrating an air conditioning system according to another exemplary embodiment of the present invention. The drawing shows just another possible example of the invention.

In conclusion, the present invention can be advantageously used in many aspects.

First, the combined ventilating and air conditioning system of the invention performs the ventilation process together with the heating or cooling process. Therefore, no matter how long the system runs, the indoor air does not easily get stuffy.

Second, heat loss is substantially reduced because the air flown from the outside and the indoor air emitted to the outside through the first vent air path exchange heat with each other in the regenerative exchanger.

Third, in a climate with high temperature and high humidity, the dehumidifying device desiccates the air from the outside, thereby providing dry and pleasant air to the indoor spaces.

Fourth, the combined ventilating and air conditioning system of the invention can be used in ventilation mode only. In this case, it is also possible to prevent heat loss to a certain degree.

Fifth, since the compressor is provided in the third air duct, it is no longer overheated due to the airflow.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A combined ventilating and air conditioning system, comprising:
   an air conditioner, which comprises a compressor, a first heat exchanger for heating or cooling indoor spaces and a second heat exchanger, a refrigerant passage controller for guiding a refrigerant compressed by the compressor to the first heat exchanger or second heat exchanger according to a driving mode of the system, and an expansion device expanding a high-temperature and high-pressure refrigerant, the expansion device being provided between the first heat exchanger and the second heat exchanger;
   a first air duct for guiding outdoor air to the indoor spaces, the first air duct being capable of opening and closing;
   a second air duct for guiding indoor air to outdoors, the second air duct being capable of opening and closing and installed in such a manner that part of the second air duct intersects with the first air duct;

a third air duct for guiding the indoor air to the outdoors, the third air duct being capable of opening and closing;

a regenerative heat exchanger, being provided in an intersection between the first and second air ducts, for exchanging heat between the indoor air and the outdoor air passing through the intersection; and blowing fans for controlling airflows, being provided in the first air duct, in the second air duct, and in the third air duct, respectively, wherein the compressor and the second heat exchanger are provided in the third air duct.

2. The combined ventilating and air conditioning system of claim 1, wherein the driving mode comprises:

a first mode for cooling the indoor spaces being closed;

a second mode for cooling and ventilating the indoor spaces;

a third mode for heating the indoor spaces being closed;

a fourth mode for heating and ventilating the indoor spaces; and a fifth mode only for ventilating the indoor spaces.

3. The combined ventilating and air conditioning system of claim 2, wherein the first heat exchanger is provided nearby an inlet of the first air duct through which the outdoor air flows into indoor spaces.

4. The combined ventilating and air conditioning system of claim 3, wherein the second heat exchanger is provided nearby an outlet of the third air duct through which the indoor air flows out.

5. The combined ventilating and air conditioning system of claim 4, wherein the regenerative heat exchanger comprises:

a first channel through which an air from an outside via the first air duct passes; and a second channel through which an air from the indoor spaces via the second air duct passes, the second channel being in contact with the first channel.

6. The combined ventilating and air conditioning system of claim 5, wherein the second channel comprises a plurality of pipes that cross the first channel.

7. The combined ventilating and air conditioning system of claim 5, wherein the first channel and the second channel are layered, crossing alternately.

8. The combined ventilating and air conditioning system of claim 7, wherein each of the first and second channels comprises zigzag-shaped plates.

9. The combined ventilating and air conditioning system of claim 5, wherein the first and second channels are made of aluminum.

10. The combined ventilating and air conditioning system of claim 5, further comprising a dehumidifying device being provided in the first air duct so as to remove humidity from the outdoor air which flows through the first air duct.

11. The combined ventilating and air conditioning system of claim 10, wherein the first channel and the second channel are layered, crossing alternately.

12. The combined ventilating and air conditioning system of claim 10, wherein the dehumidifying device is provided between the regenerative heat exchanger and the first heat exchanger.

13. The combined ventilating and air conditioning system of claim 12, wherein a blowing fan of the first air duct is provided between the dehumidifying device and the first heat exchanger.

14. The combined ventilating and air conditioning system of claim 5, wherein the third air duct is installed parallel with the first air duct.

15. The combined ventilating and air conditioning system of claim 14, wherein the first channel and the second channel are layered, crossing alternately.

16. The combined ventilating and air conditioning system of claim 15, wherein each of the first and second channels comprises zigzag-shaped plates.

17. The combined ventilating and air conditioning system of claim 16, wherein the first and second channels are made of aluminum.

18. The combined ventilating and air conditioning system of claim 15, further comprising a dehumidifying device coated with a desiccant material for absorbing humidity from air flowing through the first air duct, and for emitting the absorbed humidity to air flowing through the third air duct.

19. The combined ventilating and air conditioning system of claim 18, wherein the desiccant material comprises silica gel.

20. The combined ventilating and air conditioning system of claim 18, wherein the dehumidifying device comprises:

a axis installed parallel with the first and third air ducts;

a plurality of blades being radially extended out of the axis at regular intervals; and a rim encompassing ends of the blades.

21. The combined ventilating and air conditioning system of claim 20, wherein each of the blades has a plurality of holes through which air passes.

22. The combined ventilating and air conditioning system of claim 18, wherein the dehumidifying device is provided between the first heat exchanger and the regenerative heat exchanger.

23. The combined ventilating and air conditioning system of claim 22, further comprising a reheater for reheating air guided from the second heat exchanger to the dehumidifying device, the reheater being provided in the third air duct.

24. The combined ventilating and air conditioning system of claim 23, wherein a blowing fan in the third air duct is provided between the dehumidifying device and the second heat exchanger.

25. The combined ventilating and air conditioning system of claim 24, wherein a blowing fan for the third air duct is provided between the dehumidifying device and the reheater.

26. The combined ventilating and air conditioning system of claim 23, wherein each of the first and the second channels comprises zigzag-shaped plates.

27. The combined ventilating and air conditioning system of claim 26, wherein the first and second channels are made of aluminum.

28. The combined ventilating and air conditioning system of claim 26, wherein the desiccant material comprises silica gel.

29. The combined ventilating and air conditioning system of claim 28, wherein the dehumidifying device comprises:

a axis installed parallel with the first and third air ducts;

a plurality of blades being radially extended out of the axis at regular intervals; and a rim encompassing ends of the blades.

30. The combined ventilating and air conditioning system of claim 29, wherein each of the blades has a plurality of holes through which air passes.

31. The combined ventilating and air conditioning system of claim 29, wherein the blowing fan in the first air duct is provided between the dehumidifying device and the first heat exchanger.

32. The combined ventilating and air conditioning system of claim 31, wherein a blowing fan in the third air duct is provided between the dehumidifying device and the reheater.

33. The combined ventilating and air conditioning system of claim 32, further comprising:
a ventilation duct for guiding the outdoor air directly into the indoor spaces, being connected to the first air duct between the blowing fan in the first air duct and the first heat exchanger.

34. The combined ventilating and air conditioning system of claim 33, wherein the ventilation duct comprises:
a damper provided near a juncture of the ventilation duct and the first air duct, being fastened and rotated by a hinge, so as to selectively open or close the ventilation duct and the first air duct.

35. The combined ventilating and air conditioning system of claim 34, wherein the first and the second channels are made of aluminum.

36. The combined ventilating and air conditioning system of claim 35, further comprising a humidity sensor, for measuring humidity of outdoor air flowing into the first air duct.

37. The combined ventilating and air conditioning system of claim 36, wherein each of the blades has a plurality of holes through which air passes.

38. The combined ventilating and air conditioning system of claim 22, wherein a blowing fan in the first air duct is provided between the dehumidifying device and the first heat exchanger.

39. The combined ventilating and air conditioning system of claim 3, further comprising:
a ventilation duct for guiding the outdoor air directly into the indoor spaces, being connected to the first air duct between the blowing fan in the first air duct and the first heat exchanger.

40. The combined ventilating and air conditioning system of claim 39, wherein the ventilation duct comprises:
a damper provided near a juncture of the ventilation duct and the first air duct, being fastened and rotated by a hinge, so as to selectively open or close the ventilation duct and the first air duct.

* * * * *